(12) United States Patent
Polzer

(10) Patent No.: US 6,340,231 B1
(45) Date of Patent: *Jan. 22, 2002

(54) ELECTRICALLY ADJUSTABLE EXTERNAL REAR VIEW MIRROR

(75) Inventor: Herwig Polzer, Miltenberg (DE)

(73) Assignee: Donnelly Hohe GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/277,465

(22) Filed: Mar. 26, 1999

(30) Foreign Application Priority Data

Apr. 1, 1998 (DE) ........................ 198 14 712

(51) Int. Cl.⁷ ............................... G02B 7/182
(52) U.S. Cl. ...................... 359/872; 359/873; 359/874; 359/876
(58) Field of Search ................ 359/872, 873, 874, 876, 877, 871, 841, 843, 875; 248/476, 479, 481, 485; 362/142

(56) References Cited

U.S. PATENT DOCUMENTS

| | | | | |
|---|---|---|---|---|
| 4,105,301 A | * | 8/1978 | Doeg | 359/871 |
| 4,807,096 A | * | 2/1989 | Skogler et al. | 362/142 |
| 4,815,837 A | * | 3/1989 | Kikuchi et al. | 350/637 |
| 4,877,214 A | * | 10/1989 | Toshiaki et al. | 248/483 |
| 4,925,289 A | * | 5/1990 | Cleghorn et al. | 350/637 |
| 4,991,950 A | | 2/1991 | Lang et al. | 350/634 |
| 5,604,644 A | | 2/1997 | Lang et al. | 359/871 |
| 5,640,281 A | * | 6/1997 | Cho | 359/841 |
| 5,864,438 A | * | 1/1999 | Pace | 359/841 |
| 6,198,409 B1 | * | 3/2001 | Schofiels et al. | 340/903 |

FOREIGN PATENT DOCUMENTS

| | | | | |
|---|---|---|---|---|
| DE | 3914039 A1 | 11/1989 | ............. | B60R/1/06 |
| EP | 0090909 A2 | 10/1983 | ............. | B60R/1/06 |
| EP | 0511192 A1 | 10/1992 | ............. | B60R/1/06 |
| FR | 2426590 | 12/1979 | ............. | B60R/1/06 |
| JP | 5-232320 | 9/1993 | | |

\* cited by examiner

Primary Examiner—Mohammad Sikder
(74) Attorney, Agent, or Firm—McGlew and Tuttle, P.C.

(57) ABSTRACT

An electrically adjustable external rear view mirror (1) for a motor vehicle with a mirror element (4), a housing (3) and a mirror base (2) which may be fixed to the motor vehicle. The mirror element (4) and the housing (3) are rigidly connected together and an adjustment gear (5) which may be driven by at least one electric motor (10, 11) is arranged between housing (3) and mirror base (2).

11 Claims, 5 Drawing Sheets

ELECTRICALLY ADJUSTABLE EXTERNAL REAR VIEW MIRROR

FIELD OF THE INVENTION

The invention relates to an electrically adjustable external rear view mirror for a motor vehicle, with a mirror element, a housing, and a mirror base, which may be fixed to the motor vehicle.

BACKGROUND OF THE INVENTION

Generally speaking a motor vehicle has two external rear view mirrors to enable the driver to see the traffic behind his or her vehicle. The external rear view mirrors are arranged in the region in front of the front side windows. To enable the setting of the external rear view mirrors to be adapted according to the body size and seating position of the particular driver, the mirror element must be capable of being adjusted relative to the vehicle body. To increase driver comfort when adjusting the external rear view mirrors, electromotive adjustment gears which generate the necessary adjustment movement are used.

In the electrically adjustable external rear view mirrors known from the prior art the housing is rigidly connected to the mirror base and the mirror element is mounted in the housing in an adjustable manner with respect to the housing. In order that the mirror element does not project from the housing at any point, even at the end stops, it must be arranged in the interior of the housing with a certain distance from the housing opening. Furthermore, an air gap between mirror element and the inside of the housing is required so as to enable the mirror element to make a swivel movement in the housing.

The arrangement of the mirror element in the interior of the housing makes it difficult to clean the mirror glass with traditional cleaning equipment at gas stations, such as car washes with rotating brushes. The projecting edge of the housing also restricts the field of view visible in the mirror element, which leads to an enlargement of the required mirror surface in order to obtain an adequate field of view. This shadow formation is a drawback particularly where non-spherical mirror glasses are used. The increase in the structural volume of the external rear view mirror associated with the increase in the mirror surface increases the air resistance and the level of wind noise. Because of the large mirror housing and the resultant mass and wind force effect, the outlay involved in mechanically fastening the mirror system to the vehicle also increases, such as a large fastening surface in the so-called door triangle and greater rigidity of the door frame structure. Air turbulence, which also contributes to an increase in the noise level, is also created by the air gap between housing and mirror element.

SUMMARY AND OBJECTS OF THE INVENTION

The primary object of the present invention is to provide a generic external rear view mirror which is of small structural volume and yet permits a large field of view, causes less wind noise and can be fitted with more simple means.

According to the invention an electrically adjustable external rear view mirror for a motor vehicle is provided. The external rear view mirror includes a mirror element, a housing, and a mirror base, which may be fixed to the motor vehicle. The mirror element and the housing are rigidly connected together. An adjustment gear which may be driven by at least one electric motor is arranged between the housing and the mirror base.

The mirror element may be arranged adjoining the outside of the housing in a substantially flush manner.

As the mirror element is not adjusted in the housing, the mirror element does not need to be arranged in the interior region of the housing. The arrangement of the mirror element may therefore be arranged arbitrarily close to the outer edge of the housing opening, by which means the necessary structural volume is reduced. The smaller the projecting edge of the housing wall with respect to the mirror surface, the larger the field of vision available to the driver and the more thorough the cleaning of the mirror surface with traditional cleaning devices, such as a carwash.

As mirror element and housing are rigidly connected together, the gap between housing and mirror element is dispensed with and the wind noise generated by the external rear view mirror is additionally reduced thereby.

The largest possible field of view with the smallest structural volume and lowest noise level is obtained when the mirror element is arranged adjoining the outside of the housing in a substantially flush manner.

In order to be able to adjust the mirror element with respect to the vehicle body, according to the invention an adjustment gear which is adjustable by means of at least one electric motor is arranged between housing and mirror base. Preferably the adjustment gear may be swivelled about two axes of rotation which are not parallel to one another, in order to be able to adjust the mirror element with respect to both the vertical and the horizontal.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
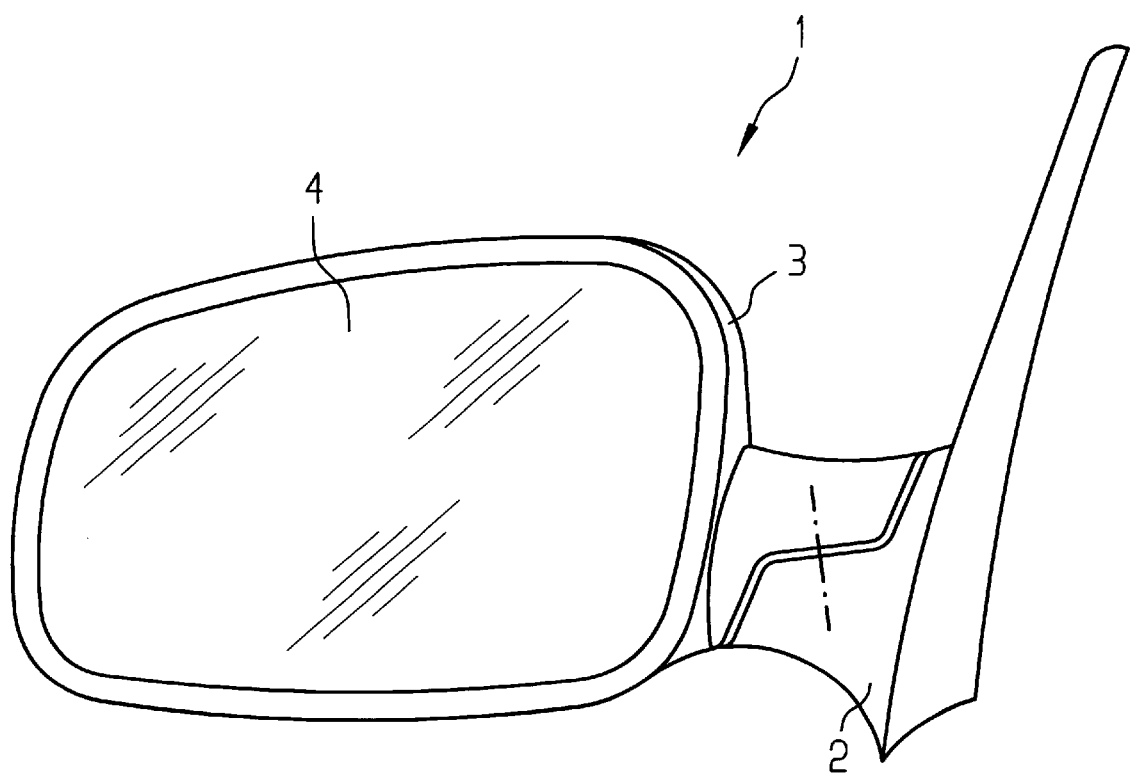
FIG. 1 is diagrammatic view of an external rear view mirror according to the invention.

Referring to the drawings in particular, FIG. 1 shows a diagrammatic view of an external rear view mirror 1 with a mirror base 2, which may be fitted to a motor vehicle body which is not shown, and a housing 3 which is rigidly connected to a mirror element 4. The connection between mirror base 2 and housing 3 is formed so that it can swivel in two axes.

Figure 2:
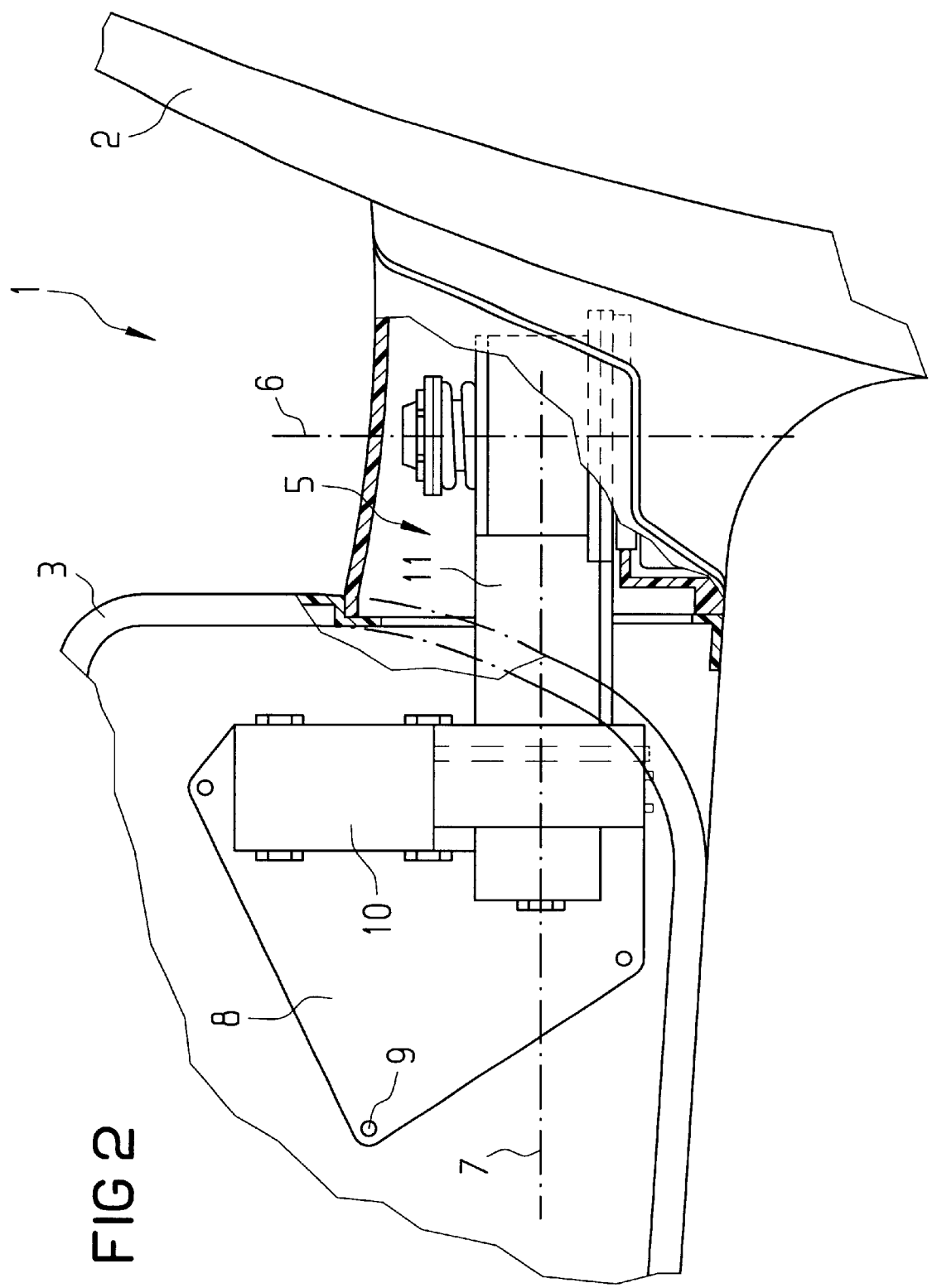
FIG. 2 is a longitudinal sectional partially broken away view showing the external rear view mirror according to FIG. 1.

FIG. 2 shows a broken longitudinal section through the external rear view mirror 1.

It will be seen that the mirror base 2 and the housing 3 are connected together by means of an adjustment device or adjustment gear 5. The adjustment gear 5 can be swivelled about the axes of rotation 6 and 7, so that the mirror surface of the mirror element 4 rigidly connected to the housing 3 is adjustable both horizontally and vertically. The reinforcement plate 8 connected to the adjustment gear 5 is connected to the housing 3 by means of three fixing bolts 9. The adjustment movements required for the adjustment of the housing 3 are generated by the electric motors 10 and 11.

Figure 3:
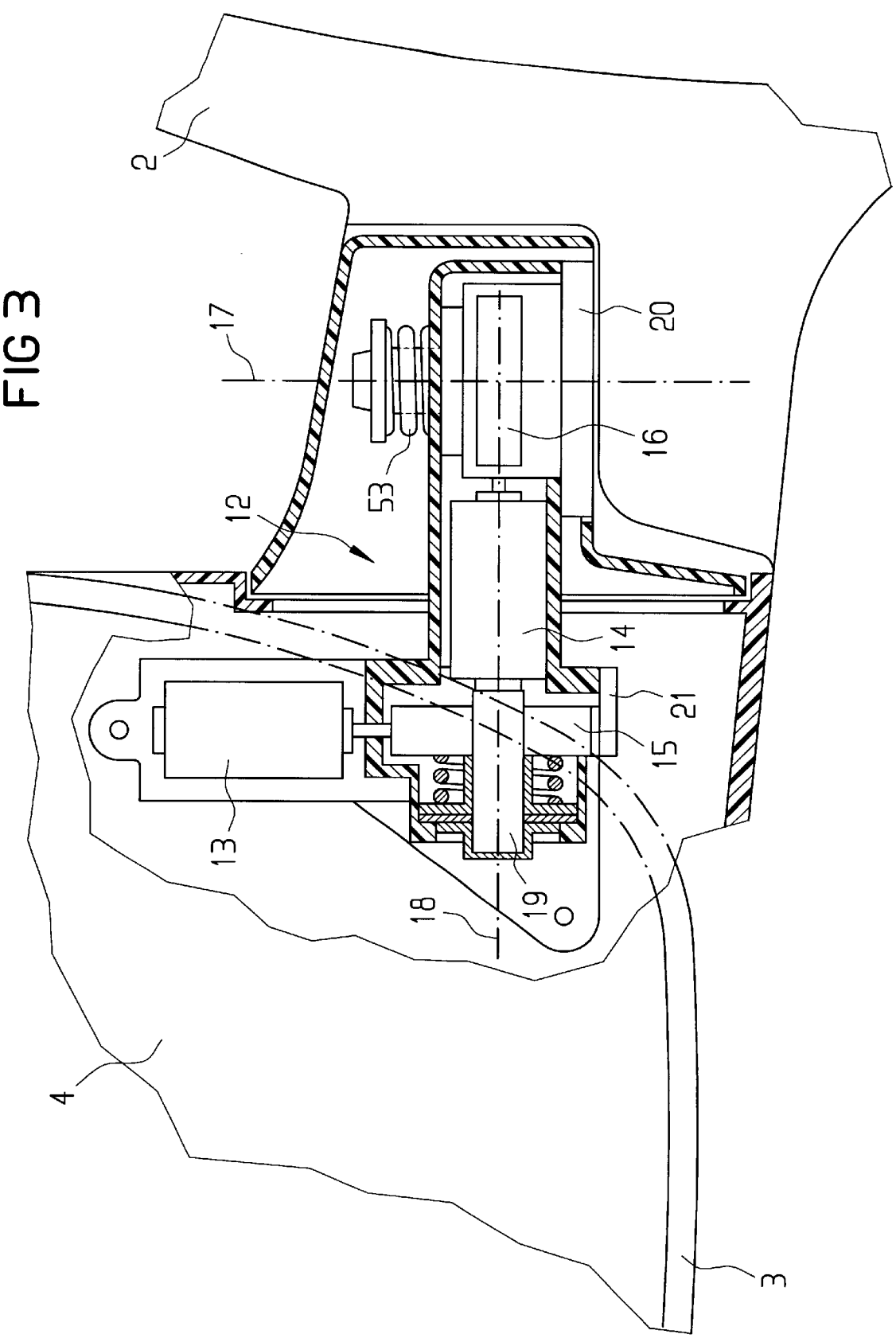
FIG. 3 is a Longitudinal sectional view of the adjustment gear of an external rear view mirror according to the invention.

FIG. 3 shows a longitudinal section through an adjustment gear 12 with electric motors 13 and 14. The drive shafts of the electric motors 13 and 14 engage in the worm gears 15 and 16 which gear down the drive movement of the two electric motors into a swivel movement of the housing 3 about the vertical axis 17 and/or horizontal axis 18.

The anti-rotation elements 19 and 53, which rule out any inadvertent swiveling of the housing 3 as a result of vibration, are arranged on the worm gears 15 and 16. A latching disk 20, which enables the housing 3 to rotate about the vertical axis 17 when a load acting on the housing 3 is exceeded, is arranged between the worm gear 16 and the mirror base 2, so that the external rear view mirror passes the prescribed pendulum impact test which simulates a child's head impacting on the external rear view mirror. The torque acting on the horizontal axis 18 is transferred by means of a slipping clutch 21 which slips when an external load acting on the housing 3 is exceeded. The external rear view mirror may also be adjusted by means of the latching disk 20 and the slipping clutch 21 if the electric drive of the adjustment gear 12 fails.

Figure 4:
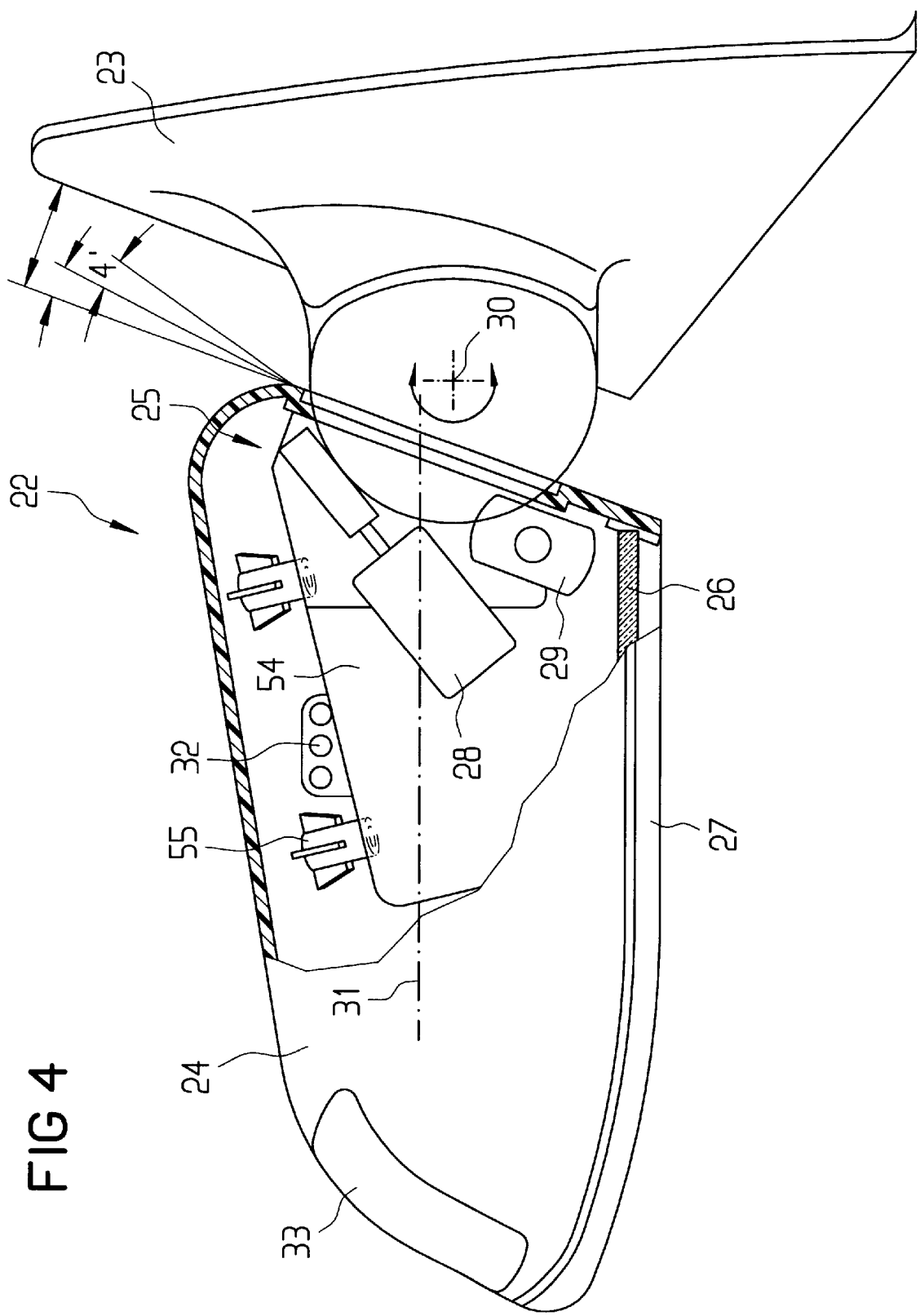
FIG. 4 is a diagrammatic partially broken away longitudinal sectional view from the top of a second embodiment of an external rear view mirror according to the invention.

FIG. 4 shows a further embodiment 22 of an external rear view mirror according to the invention with a mirror base 23, a housing 24 shown in broken form and an adjustment gear 25. The mirror element 26 is fixed to the housing 24 by means of a circumferential fixing ring 27. The ring 27 is clipped to the housing for this purpose. The mirror element 26 thus adjoins the outside of the housing 24 in substantially flush manner. The adjustment gear 25 may be adjusted by means of the vertical drive motor 28 and the horizontal drive motor 29 so that the housing 24 is swivelled in rotary manner about the vertical axis 30 and/or about the horizontal axis 31. The adjustment gear 25 is bolted to the housing 24 by means of the reinforcement plate 54. For this purpose, on its inside the housing 24 has several threaded sleeves 55 molded onto the component wall. An entry lighting 32 composed of LEDs and a direction indicator 33 are integrated into the housing 24 as additional functional features.

Figure 5:
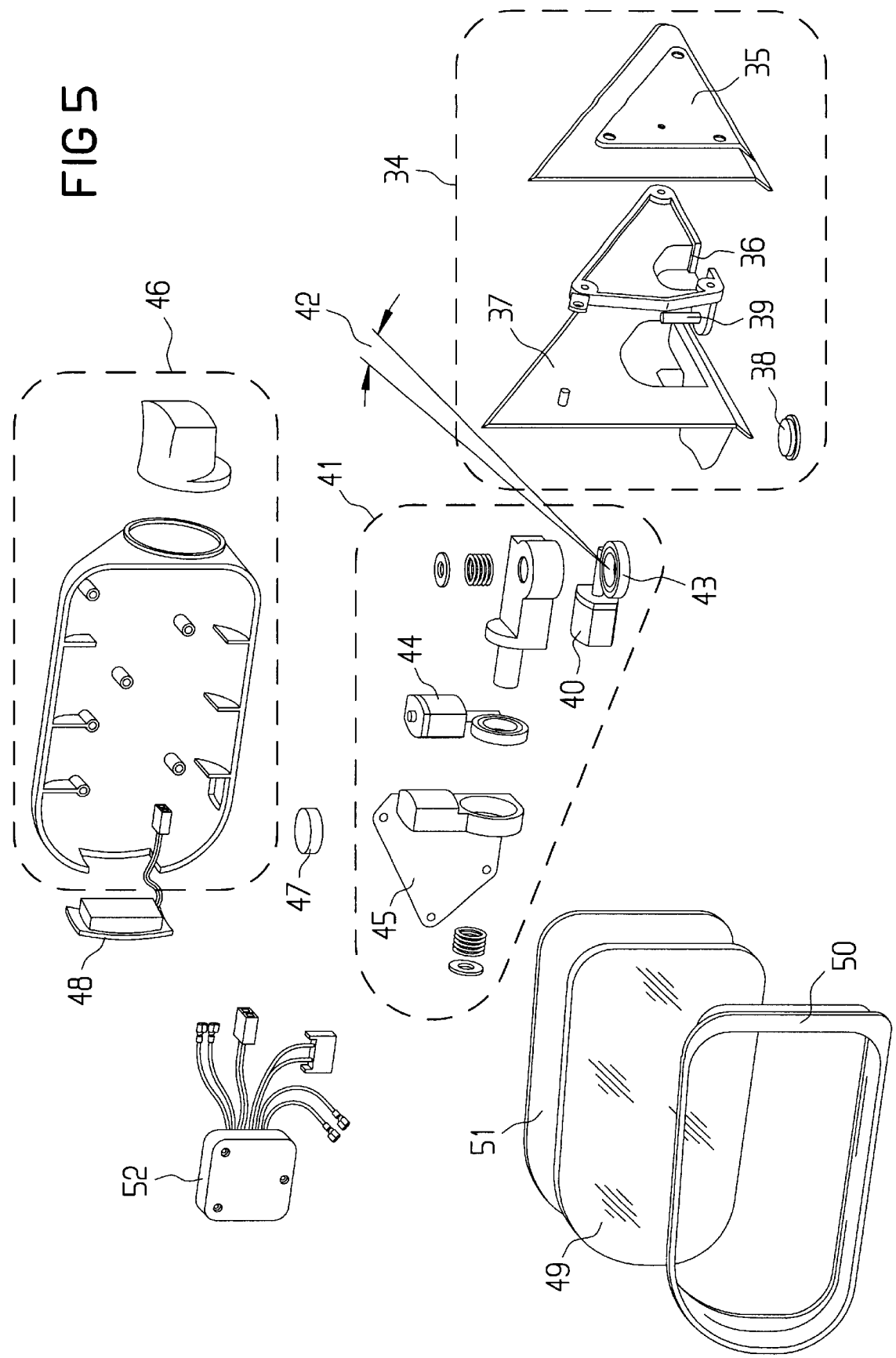
FIG. 5 is an exploded view of an external rear view mirror according to the invention.

FIG. 5 shows an exploded view of an external rear view mirror according to the invention, in which the components of the various assemblies are enclosed within dashed lines. The mirror base 34 is composed of a base 35, a base frame 36, a cover 37 and a cap 38.

A Y-axis drive 40 of the adjustment gear 41 is arranged on stay-bolt 39 of the base frame 36. The housing 46 may be adjusted within a swivel angle of +/−4 degrees in the swivel range 42 by means of the drive 40. The swivel range may be varied according to the type of vehicle. A latching disk 43 is arranged under the drive 40.

An X-axis drive 44, which acts on a reinforcement plate 45 which is connected to the housing 46 in its turn, adjoins the drive 40. An entry light 47 and a direction indicator 48 are integrated into the housing 46 as further functional elements.

The mirror element 49 is fitted to the housing 46 by means of the retaining ring 50. To rule out an icing of the mirror element 49, a heating element 51 is arranged on its rear side. The control commands to control the various functions of the mirror are transferred to the various actors by a mirror bus module 52.

While specific embodiments of the invention have been shown and described in detail to illustrate the application of the principles of the invention, it will be understood that the invention may be embodied otherwise without departing from such principles.

What is claimed is:

1. An electrically adjustable external rear view mirror for a motor vehicle, the electrically adjustable external rear view mirror comprising:

a mirror element comprising a mirror reflector surface, said mirror element having a rearward view when mounted on the motor vehicle to enable a driver of the vehicle to see traffic behind the vehicle;

a housing, said mirror element being incorporated in a cavity formed by said housing, said housing and said mirror element being rigidly connected together such that said mirror element cannot move independent of movement of said housing;

a mirror base fixable to the motor vehicle, said housing connecting to and adjustable about said mirror base;

an electrically operated adjustment device comprising at least one electric motor for adjustment of said housing about two non-parallel axes of rotation relative to said mirror base wherein said rearward view of said mirror element is electrically adjusted by said two-axis adjustment of said housing relative to the vehicle body allowing the driver to set said rearward view at a preferred setting from a plurality of settings according to the body size and seating position of the driver of the vehicle and wherein said adjustment device includes at least one anti-rotational element whereby inadvertent swiveling of said housing is reduced; and wherein said adjustment device comprises at least one worm gear operated by said at least one electrical motor, said at least one anti-rotational element being arranged directly on said at least one worm gear.

2. The external rear view mirror according to claim 1, wherein said mirror element is arranged adjoining an outside of said housing in a substantially flush manner.

3. The external rear view mirror according to claim 1, wherein there is no gap between said mirror and said housing, at a mirror surface side of said mirror.

4. The external rear view mirror according to claim 1, wherein said electrically operated adjustment device comprises a first electric motor, a second electric motor, a connection between said first electric motor and one or both of said mirror base and said external housing for adjusting the position of the mirror surface relative to said mirror base about said first axis of rotation and another connection between said second electric motor and one or both of said mirror base and said housing for adjusting the position of the mirror surface relative to said mirror base about said second axis of rotation.

5. The external rear view mirror according to claim 4, wherein said first electric motor and said second electric motor are located at least partially in said housing.

6. The external rear view mirror according to claim 5, further comprising: a reinforcement plate connected to said housing, said first electric motor and said second electric motor being connected to said housing via said reinforcement plate.

7. The external rear view mirror according to claim 4, wherein at least on said first electric motor and said second electric motor are located partially in said mirror base.

8. The external rear view mirror according to claim 1, further comprising a lighting device included in said external rear view mirror.

9. The external rear view mirror according to claim 8 wherein said lighting device comprises an entry light.

10. The external rear view mirror according to claim 8 wherein said lighting device comprises a direction indicator.

11. The external rear view mirror according to claim 8 wherein said lighting device comprises at least one light emitting diode.

\* \* \* \* \*